T. H. LEMP & H. M. COBB.
LOG CHAIN DOG.
APPLICATION FILED MAR. 28, 1916.

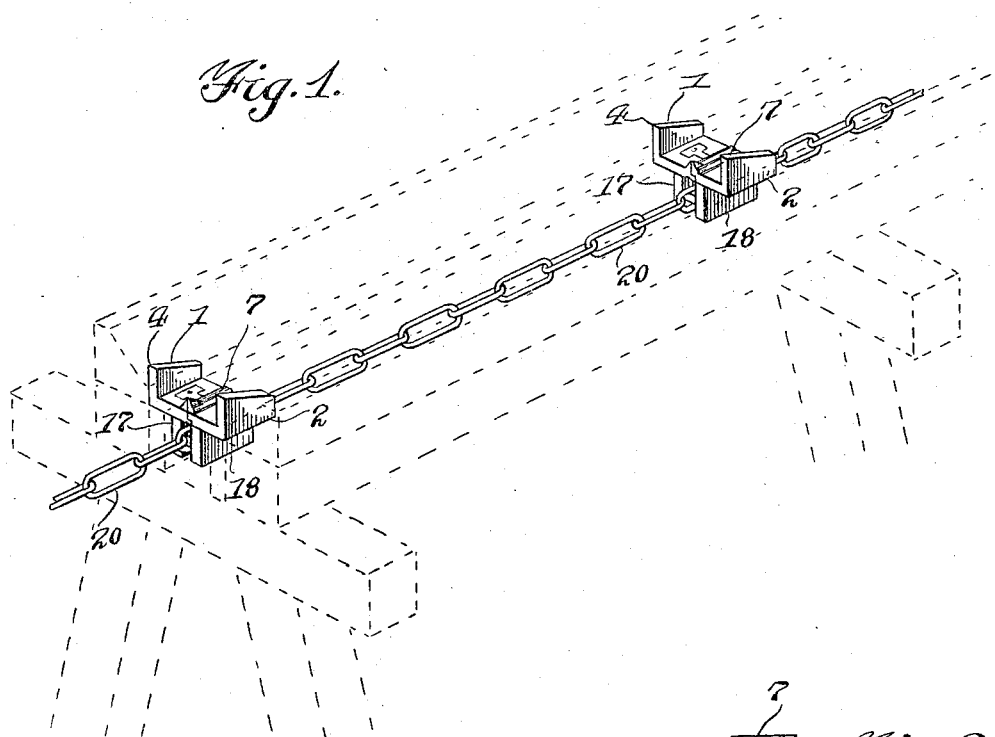
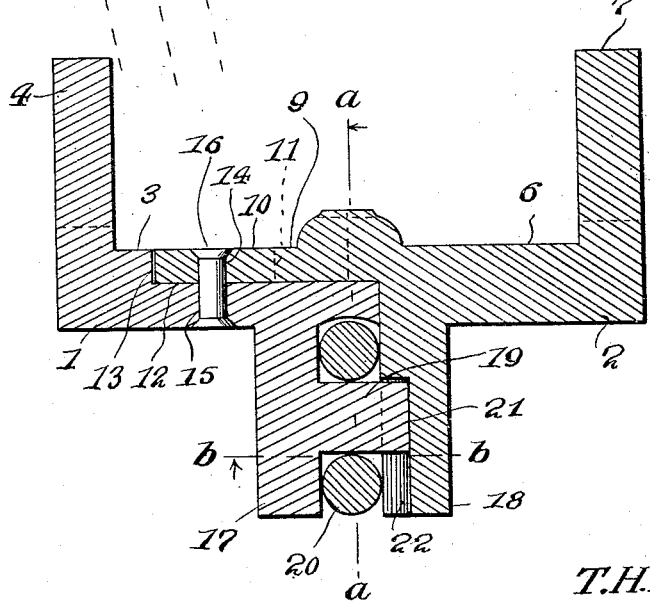

1,212,076.

Patented Jan. 9, 1917.
2 SHEETS—SHEET 2.

Inventors
T.H.Lemp and
H.M.Cobb.

Witnesses

By Victor J. Evans
Attorney

UNITED STATES PATENT OFFICE.

THOMAS H. LEMP AND HURLEY M. COBB, OF BAGDAD, FLORIDA.

LOG-CHAIN DOG.

1,212,076.  Specification of Letters Patent.  Patented Jan. 9, 1917.

Application filed March 28, 1916. Serial No. 87,273.

*To all whom it may concern:*

Be it known that we, THOMAS H. LEMP and HURLEY M. COBB, citizens of the United States, residing at Bagdad, in the county of Santa Rosa and State of Florida, have invented new and useful Improvements in Log-Chain Dogs, of which the following is a specification.

This invention relates to improvements in log chain dogs such as are used at saw mills for carrying logs on the log haul to the mill, the object of the invention being to provide an improved chain dog which may be readily attached to a chain and without the employment of the blocks heretofore used.

The invention consists in the construction, combination and arrangement of devices hereinafter described and claimed.

Figure 3:
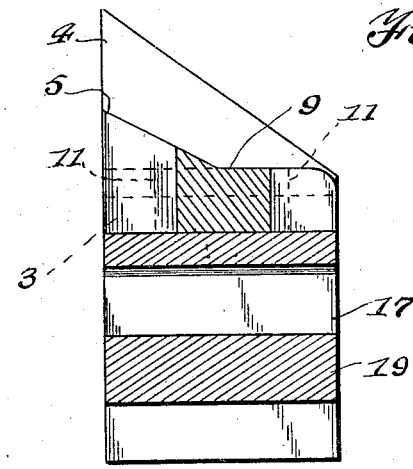
Figure 5:
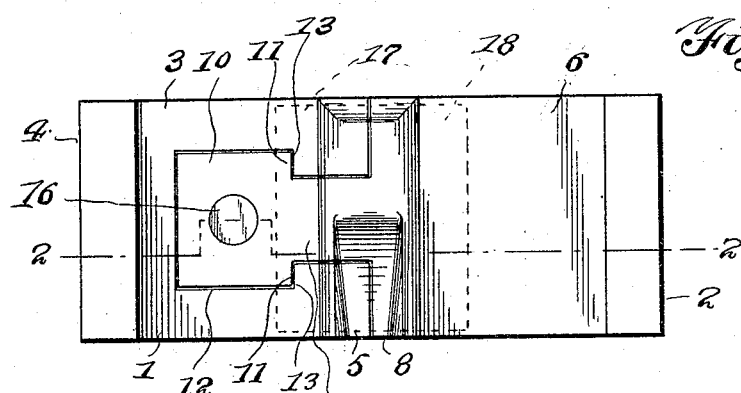
Figure 4:
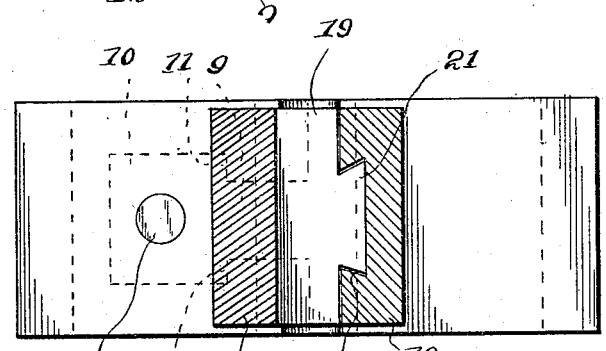

In the accompanying drawings:—Figure 1 is a perspective view of a log chain dog constructed and arranged in accordance with our invention, showing the same attached to a log chain and arranged in operative relation to a log haul, the latter being indicated in dotted outline. Fig. 2 is a vertical longitudinal sectional view of our improved dog. Fig. 3 is a vertical transverse sectional view of the same on the plane indicated by the line $a$—$a$ of Fig. 2. Fig. 4 is a detail horizontal sectional view of the same on the plane indicated by the line $b$—$b$ of Fig. 2. Fig. 5 is a detail plan of the same.

Our improved log chain dog comprises a pair of separable interlocking members 1, 2. The member 1 comprises a base 3, a triangular upwardly extending log engaging lug or point 4 at the outer end of the base and an upwardly extending somewhat similar point or lug 5 at the inner end of the base and which is of much less height than the lug or point 4. The member 2 comprises a base 6 which is similar to that of the member 1, a lug or point 7 at the outer end of the base, similar to the point 4 and a lug or point 8 at the inner end of the base similar to point 5. Said member 2 also has a locking arm 9 which projects from the inner end of its base and the upper side of which is level with that of the base. This locking arm has a widened head 10, here shown as rectangular in form and providing shoulders 11. The base of the member 1 is provided in its upper side with a recess 12 of suitable depth to receive the arm 9 and of a size and shape corresponding with said arm so that when the latter is fitted in the recess, by downward vertical movement of the member 2, the shoulders 11 of the head 10 engage shoulders 13 formed in the sides of the recess and hence the members 1, 2 are locked together against relative longitudinal movement. The arm 9 of the member 2 and the recess portion of the base of the member 1 are provided with registering openings 14, 15 respectively for the reception of a rivet or other suitable fastening device 16 which when in place also locks said members 1, 2 together against separation by vertical relative movement. The members 1, 2 are also respectively provided near their inner ends with depending vertical arms 17, 18. The arm 17 is provided with a fixed block 19 on its inner side, at a suitable distance below the base and which block is adapted to be passed through a link of the chain 20 and is provided on its outer base, which is opposed to the arm 18, with a dove-tail or other overhanging locking projection 21 which is slidably fitted in a vertical locking recess 22 of the arm 18, the vertical sides of said recess also overhanging and corresponding with those of the locking projection. Hence the projection 21 and recess 22 coact to detachably lock the members 1, 2 together so that the engaged link of the chain is held between the arms 17, 18 and on the block 19 as will be understood. The said block is in practice preferably integral with the arm 17 and in practice the members 1, 2 are also preferably each a single casting.

It will be understood from the foregoing that when the members are thus interlocked they are also firmly and securely connected to the chain and so strongly that there is no likelihood of the dog becoming detached from the chain. The rivet which secures the members of the dog together is not subjected to any stress whatever other than merely the weight of the member 2 when the dog is depending from the under lead of the chain and returning to the pond.

The dog when on the upper lead of the chain and in use for carrying a log to the mill operates in the bottom of the log haul indicated at A in Fig. 1 and which is of the usual construction.

While we have herein shown and described a preferred form of our invention we would have it understood that changes may be made in the form, proportion and construction of the several parts without departing from the spirit of our invention and within the scope of the appended claims.

Having thus described our invention what we claim is:—

1. A log chain dog comprising a pair of separable members, one having a transversely arranged locking arm extending from the inner end of its base and the other having a correspondingly shaped locking recess in the upper side of its base for engagement by said arm, said recess and said arm having correspondingly shaped widened portions causing said recess and arm to unlock said separable members, said members also having chain engaging means extending downwardly from their bases and comprising a pair of arms, one of said arms having a block to extend through the chain link.

2. A log chain dog comprising a pair of separable members, one having a transversely arranged locking arm extending from the inner end of its base and the other having a correspondingly shaped locking recess in the upper side of its base for engagement by said arm, said recess and said arm having correspondingly shaped widened portions causing said recess and arm to unlock said separable members, said members also having chain engaging means extending downwardly from their bases and comprising a pair of arms, one of said arms having a block to extend through a chain link, and provided at the outer end with a dove-tailed projection, the other depending arm having a vertical dove-tailed groove engaged by said dove-tailed projection.

In testimony whereof we affix our signatures in presence of two witnesses.

THOMAS H. LEMP.
HURLEY M. COBB.

Witnesses:
N. A. GARRETT,
PETER ROSASCO.

Copies of this patent may be obtained for five cents each, by addressing the "Commissioner of Patents, Washington, D. C."